United States Patent
Kelley et al.

(10) Patent No.: US 12,091,590 B2
(45) Date of Patent: Sep. 17, 2024

(54) SILICONE PRESSURE SENSITIVE ADHESIVE AND METHODS FOR THE PREPARATION AND USE THEREOF

(71) Applicant: Dow Silicones Corporation, Midland, MI (US)

(72) Inventors: Elizabeth Kelley, Midland, MI (US); Hanna Yang, Seoul (KR)

(73) Assignee: Dow Silicones Corporation, Midland, MI (US)

( * ) Notice: Subject to any disclaimer, the term of this patent is extended or adjusted under 35 U.S.C. 154(b) by 0 days.

(21) Appl. No.: 18/509,668

(22) Filed: Nov. 15, 2023

(65) Prior Publication Data

US 2024/0093075 A1 Mar. 21, 2024

Related U.S. Application Data

(62) Division of application No. 17/637,136, filed as application No. PCT/US2021/049754 on Sep. 10, 2021, now Pat. No. 11,859,111.

(60) Provisional application No. 63/120,859, filed on Dec. 3, 2020.

(51) Int. Cl.
*C09J 183/04* (2006.01)
*C09J 7/25* (2018.01)
*C09J 7/38* (2018.01)

(52) U.S. Cl.
CPC ........... *C09J 183/04* (2013.01); *C09J 7/255* (2018.01); *C09J 7/38* (2018.01)

(58) Field of Classification Search
CPC ......... C09K 183/04; C09J 183/04; C09J 7/38; C09J 7/255
See application file for complete search history.

(56) References Cited

U.S. PATENT DOCUMENTS

| | | |
|---|---|---|
| 2,823,218 A | 2/1958 | Speir et al. |
| 3,159,601 A | 12/1964 | Ashby et al. |
| 3,220,972 A | 11/1965 | Lamoreaux et al. |
| 3,296,291 A | 1/1967 | Scotia et al. |
| 3,419,593 A | 12/1968 | Willing et al. |
| 3,445,420 A | 5/1969 | Kookootsedes et al. |
| 3,516,946 A | 6/1970 | Scotia et al. |
| 3,814,730 A | 6/1974 | Karstedt et al. |
| 3,928,629 A | 12/1975 | Chandra et al. |
| 3,957,713 A | 5/1976 | Jeram et al. |
| 3,983,298 A | 9/1976 | Hahn et al. |
| 3,989,667 A | 11/1976 | Lee et al. |
| 3,989,668 A | 11/1976 | Lee et al. |
| 4,329,273 A | 5/1982 | Hardman et al. |
| 4,766,176 A | 8/1988 | Lee et al. |
| 4,784,879 A | 11/1988 | Lee et al. |
| 4,935,484 A | 6/1990 | Wolfgruber et al. |
| 5,017,654 A | 5/1991 | Togashi et al. |
| 5,036,117 A | 7/1991 | Chung et al. |
| 5,110,882 A * | 5/1992 | Hamada ............... C09J 183/04 528/31 |
| 5,175,325 A | 12/1992 | Brown et al. |
| 5,324,806 A | 6/1994 | Burnell et al. |
| 6,605,734 B2 | 8/2003 | Roy et al. |
| 6,677,407 B1 | 1/2004 | Bilgrien et al. |
| 7,728,080 B2 | 6/2010 | Aoki et al. |
| 8,017,712 B2 | 9/2011 | Berry et al. |
| 8,178,207 B2 | 5/2012 | Mizuno et al. |
| 8,754,174 B2 | 6/2014 | Aoki et al. |
| 10,351,742 B2 | 7/2019 | Brown et al. |
| 2014/0114029 A1 | 4/2014 | Cray et al. |

FOREIGN PATENT DOCUMENTS

| | | |
|---|---|---|
| EP | 347895 | 12/1989 |
| JP | 11290552 | 10/1999 |

OTHER PUBLICATIONS

Noll, Chemistry and Technology of Silicones, ch. 1, p. 1-9.

* cited by examiner

*Primary Examiner* — Robert D Harlan
(74) *Attorney, Agent, or Firm* — Catherine U. Brown

(57) ABSTRACT

A silicone pressure sensitive adhesive composition contains an alkenyl-functional polydiorganosiloxane gum, a polyorganosilicate resin, a polyorganohydrogensiloxane crosslinker, a migration reducing additive, a hydrosilylation reaction catalyst, a hydrosilylation reaction inhibitor, and a solvent. Methods for preparing the silicone pressure sensitive adhesive composition and using it to form a protective film are provided.

11 Claims, No Drawings

SILICONE PRESSURE SENSITIVE ADHESIVE AND METHODS FOR THE PREPARATION AND USE THEREOF

CROSS REFERENCE TO RELATED APPLICATIONS

This application is a Divisional Applications of U.S. patent application Ser. No. 17/637,136 filed 10 Sep. 2021, which is the National Stage of International Application No. PCT/US21/049754, filed 10 Sep. 2021, which claims the benefit of U.S. Provisional Patent application Ser. No. 63/120,859 filed on 3 Dec. 2020 under 35 U.S.C. § 119 (e). U.S. patent application Ser. No. 17/637,136, International Application Serial No. PCT/US21/049754 and U.S. Provisional Patent application Ser. No. 63/120,859 is hereby incorporated by reference.

TECHNICAL FIELD

A silicone pressure sensitive adhesive composition and methods for its preparation and use are disclosed. More particularly, a silicone pressure sensitive adhesive composition that cures to form a silicone pressure sensitive adhesive with low migration useful in protective film applications is disclosed herein.

INTRODUCTION

Protective films are applied to plastics, such as exteriors of appliances, e.g., frame and back plates in home appliances. The protective film protects the surface of the plastic against damage (such as scratching) during manufacture and shipping to consumers. The protective film should have smooth wettability with easy removal correlated with processability, stable performance under severe conditions (e.g., temperature) associated with storage and shipping of the appliances. Another desired property is that the protective film leaves little to no residue on the surface of the plastic, e.g., when the protective film is removed by the consumer after purchasing the appliance.

Silicone pressure sensitive adhesives have been proposed for fabrication of such protective films. Typical silicone pressure sensitive adhesive compositions are composed of mainly silicone polymer and silicone resin and require crosslinker and platinum catalyst for hydrosilylation reaction. The protective film can be produced by coating a silicone pressure sensitive adhesive composition on a filmic backing substrate and curing said composition to produce a silicone pressure sensitive adhesive layer on the substrate.

For example, U.S. Pat. No. 8,178,207 to Mizuno et al. discloses a silicone-based pressure sensitive adhesive composition giving a pressure-sensitive adhesive layer with super-low silicone-transfer properties that no adhesive residue can be detected by human eyes and does not transfer a silicone component even if it is exposed to heat treatment equal to or greater than 250° C.

Problems to be Addressed

A silicone pressure sensitive adhesive composition that cures to form a silicone pressure sensitive adhesive suitable for use in protective film applications is desired. The silicone pressure sensitive adhesive should have good adhesion to adherends such as glass, metal and plastic. As used herein, 'good adhesion' is initial adhesion and minimal change of adhesion, which are desired to prevent any impact on easy removal when peeling off silicone pressure sensitive adhesive from adherends by a consumer and smooth wettability when attaching the silicone pressure sensitive adhesive to an adherend. When removed, the silicone pressure sensitive adhesive should leave minimal or no stain on these adherends. As used herein "stain" refers to migration from the silicone pressure sensitive adhesive to the adherend resulting in darkening or other changes to the adherend that are visible to the naked eye after removal of the silicone pressure sensitive adhesive.

SUMMARY

A silicone pressure sensitive adhesive composition, method for its preparation, and method of use of the composition for making a protective film are provided.

DETAILED DESCRIPTION

The silicone pressure sensitive adhesive composition (composition) herein comprises (A) a polydiorganosiloxane gum, (B) a polyorganosilicate resin, (C) a polyorganohydrogensiloxane, (D) a polydialkylcyclosiloxane, (E) a hydrosilylation reaction catalyst, (F) a hydrosilylation reaction catalyst inhibitor, and (G) an organic solvent.

(A) Alkenyl-Functional Polydiorganosiloxane Gum

Starting material (A) in the composition is a polydiorganosiloxane gum (gum). The gum may have unit formula $(R^1_3SiO_{1/2})_a(R^1_2R^2SiO_{1/2})_b(R^1_2SiO_{2/2})_c(R^1R^2SiO_{2/2})_d$, where each $R^1$ is an independently selected alkyl group of 1 to 10 carbon atoms; each $R^2$ is an independently selected alkenyl group with 2 to 10 carbon atoms; subscript a is 0, 1, or 2; subscript b is 0, 1, or 2; a quantity (a+b)=2, subscript $c \geq 0$; subscript $d \geq 0$; a quantity (c+d) has a value sufficient to provide the gum with a molecular weight $\geq 400,000$ Da; and a quantity (b+d) is sufficient to provide a silicon bonded alkenyl content of at least 0.01 weight % based on weight of the gum. Alternatively, the quantity (b+d) may have a value sufficient to provide the gum with an alkenyl content of at least 0.05%, and alternatively at least 0.06 weight %. At the same time, the quantity (b+d) may have a value sufficient to provide the gum with an alkenyl content up to 0.1%, alternatively up to 0.07% based on the weight of the gum. Alternatively, the quantity (c+d) may have a value sufficient to provide the gum with a molecular weight of 400,000 Da to 1,000,000 Da; alternatively 500,000 Da to 900,000 Da; and alternatively 600,000 Da to 800,000 Da.

The alkyl groups for $R^1$ may be methyl, ethyl, propyl (including n-propyl and/or isopropyl), butyl (including n-butyl, t-butyl, sec-butyl, and/or isobutyl), pentyl (including cyclopentyl, n-pentyl, and branched isomeric species with 5 carbon atoms), hexyl (including cyclohexyl, n-hexyl, and branched isomeric species with 6 carbon atoms), heptyl (including cycloheptyl, n-heptyl, and branched isomeric species with 7 carbon atoms), octyl (including cyclooctyl, n-octyl, and branched isomeric species with 8 carbon atoms), nonyl (including cyclononyl, n-nonyl, and branched isomeric species with 9 carbon atoms), and decyl (including cyclodecyl, n-decyl, and branched isomeric species with 10 carbon atoms). Alternatively, each $R^1$ may be methyl, ethyl, propyl or butyl; alternatively methyl or ethyl; and alternatively methyl.

The alkenyl groups for $R^2$ are capable of undergoing hydrosilylation reaction with the silicon bonded hydrogen atoms (SiH) of starting material (C). Suitable alkenyl groups for IV may be selected from the group consisting of vinyl, allyl, and hexenyl; alternatively vinyl and hexenyl; and alternatively vinyl.

Examples of suitable gums include a trimethylsiloxy-terminated poly(dimethylsiloxane/methylvinylsiloxane) copolymer, a dimethylvinylsiloxy-terminated polydimethylsiloxane homopolymer, a dimethylvinylsiloxy-terminated poly(dimethylsiloxane/methylvinylsiloxane) copolymer, a dimethylhexenylsiloxy-terminated poly(dimethylsiloxane/methylhexenylsiloxane) copolymer, a dimethylhexenylsiloxy-terminated polydimethylsiloxane homopolymer, a dimethylhexenylsiloxy-terminated poly(dimethylsiloxane/methylhexenylsiloxane) copolymer, and a combination of two or more thereof. Gums can be made by known methods, such as those described in U.S. Pat. No. 3,983,298 to Hahn, et al.; U.S. Pat. No. 7,728,080 to Aoki; and U.S. Pat. No. 8,754,174 to Aoki; e.g., by catalytically polymerizing octamethylcyclotetrasiloxane or similar oligomer with a silane compound or a siloxane compound having dimethylvinylsiloxane units and a silane compound or a siloxane compound having dimethylsiloxane units and/or methylvinylsiloxane units. One skilled in the art would recognize that the thus polymerized reaction product contains low molecular weight cyclic siloxanes, and therefore, the low molecular cyclic siloxanes may be fully or partially removed, e.g., by stripping or distilling at elevated temperature and/or under reduced pressure by introducing an inert gas.

The gum selected for use in the silicone pressure sensitive adhesive composition may be one gum or may comprise more than one gum, where the gums differ in at least one property such as molecular weight, selection of alkyl and/or alkenyl groups, type of terminal siloxane units, and sequence of the siloxane units in the polymer backbone.

(B) Polyorganosilicate Resin

The composition further comprises (B) a polyorganosilicate resin (resin). The resin may comprise unit formula $(R^1_3SiO_{1/2})_e(R^1_2R^2SiO_{1/2})_f(SiO_{4/2})_g(ZO_{1/2})_h$, where $R^1$ and $R^2$ are as described above, Z is a hydrogen atom or an alkyl group of 1 to 6 carbon atoms, subscripts e, f, g, and h represent mole fractions of each unit, e≥0, f≥0, g≥0, h≥0, and a quantity (e+f+g)=1. Subscripts e, f, and g may have values such that a molar ratio of monofunctional units, i.e., the units $(R^1_3SiO_{1/2})$ and $(R^1_2R^2SiO_{1/2})$ to quadrifunctional units, i.e., units of formula $(SiO_{4/2})$ are present in a ratio of 0.6:1 to 1.1:1, alternatively 0.9:1 to 1.1:1. Subscript h may have a value sufficient to give the resin a $(ZO_{1/2})$ group content up to 5.0 weight %, alternatively 0 to 4.5%, alternatively 0 to 4.0%, alternatively 0 to 3.5%, alternatively 0 to 3.0%, alternatively 0 to 2.5%, alternatively 0 to 2.0%, alternatively 0.5 to 1.5%, and alternatively 0 to 1.1% based on weight of the resin. Alternatively, Z may be hydrogen, and the resin may have a hydroxyl group content of 0 to 5.0%, alternatively 0 to 4.5%, alternatively 0 to 4.0%, alternatively 0 to 3.5%, alternatively 0 to 3.0%, alternatively 0 to 2.5%, alternatively 0 to 2.0%, alternatively 0.5 to 1.5%, and alternatively 0.9% to 1.1% based on weight of the resin. The resin may optionally further comprise up to 20% of difunctional units, e.g., of formula $(R^1_2SiO_{2/2})$ and/or trifunctional units of formula $(R^1SiO_{3/2})$. The resin may have a number average molecular weight (Mn) measured by GPC of 3,000 Da to 10,000 Da, alternatively 4,000 Da to 10,000 Da, alternatively 5,000 Da to 8,000 Da, alternatively 6,000 Da to 7,000 Da. Alternatively, the resin may have a weight average molecular weight (Mw) of 5,000 Da to 50,000 Da, alternatively 8,000 Da to 40,000 Da, alternatively 10,000 Da to 30,000 Da, alternatively 13,000 Da to 20,000 Da.

The polyorganosilicate resin may be prepared by known methods, such as those disclosed in U.S. Pat. No. 8,017,712 to Berry, et al. and the references cited therein and U.S. Pat. No. 10,351,742 to Brown, et al. and the references cited therein. Polyorganosilicate resins are also commercially available from various sources such as Dow Silicones Corporation of Midland, Michigan, USA; Momentive Performance Materials of Albany, New York, USA, and Bluestar Silicones USA Corp. of East Brunswick, New Jersey, USA. For example, DOWSIL™ MQ-1600 Solid Resin, DOWSIL™ MQ-1601 Solid Resin, and DOWSIL™ MQ-1640 Flake Resin are available from Dow Silicones Corporation.

The resin is present in the composition in an amount sufficient to provide a molar ratio of amount of (B) resin to amount of (A) gum (i.e., Resin:Gum ratio) of 1.5:1 to 0.5:1; alternatively 1.25:1 to 0.6:1; alternatively 1:1 to 0.7:1; and alternatively 0.9:1 to 0.8:1. The resin selected for use in the silicone pressure sensitive adhesive composition may be one resin or may comprise more than one resin, where the resins differ in at least one property such as molecular weight, selection of alkyl and/or alkenyl groups, type of terminal siloxane units, and molecular weight.

(C) Polyorganohydrogensiloxane Crosslinker

Starting material (C) is a polyorganohydrogensiloxane that may have unit formula (c1): $(R^1_3SiO_{1/2})_k(R^1_2HSiO_{1/2})_m(R^1HSiO_{2/2})_i(R^1_2SiO_{2/2})_j$, where $R^1$ is an alkyl group as described above, and subscripts k, m, i, and j represent numbers of each unit in the formula and have values such that k is 0, 1, or 2; m is 0, 1, or 2; a quantity (k+m)=2; i>0; and j≥0. A quantity (i+j+k+m) is sufficient to provide the polyorganohydrogensiloxane with a degree of polymerization of 5 to 2000, alternatively 10 to 1000, alternatively 30 to 100; alternatively 50 to 80.

Alternatively, when k=2, m=0, and j=0, the polyorganohydrogensiloxane may have unit formula (c2): $(R^1_3SiO_{1/2})_2(HR^1SiO_{2/2})_i$, where $R^1$ is an alkyl group as described above, subscript i is sufficient to give the polyorganohydrogensiloxane a viscosity of 10 to 50 cSt, alternatively 20 to 40 cSt, measured at 25° C. and 0.1 to 50 RPM on a Brookfield DV-III cone & plate viscometer with #CP-52 spindle. One skilled in the art would recognize that rotation rate decreases as viscosity increases and would be able to select the appropriate rotation rate when using this test method to measure viscosity. Alternatively, subscript i can be 30 to 100, alternatively 50 to 80, alternatively 60 to 70, and alternatively 70 to 80.

Suitable polyorganohydrogensiloxanes for use in the composition are exemplified by:

(c3) α,ω-dimethylhydrogensiloxy-terminated poly(dimethylsiloxane/methylhydrogensiloxane), (c4) α,ω-dimethylhydrogensiloxy-terminated polymethylhydrogensiloxane, (c5) α,ω-trimethylsiloxy-terminated poly(dimethylsiloxane/methylhydrogensiloxane), (c6) α,ω-trimethylsiloxy-terminated polymethylhydrogensiloxane, (c7) α-dimethylhydrogensiloxy-ω-trimethylsiloxy-terminated poly(dimethylsiloxane/methylhydrogensiloxane), (c8) α-dimethylhydrogensiloxy-ω-trimethylsiloxy-terminated polymethylhydrogensiloxane, and (c9) a combination of two or more thereof.

Methods of preparing polyorganohydrogensiloxanes, such as hydrolysis and condensation of organohalosilanes, are well known in the art, for example, in U.S. Pat. No. 2,823,218 to Speier, et al.; U.S. Pat. No. 3,957,713 to Jeram et al. and U.S. Pat. No. 4,329,273 to Hardman, et al. Polyorganohydrogensiloxanes are also commercially available, such as those available from Gelest, Inc. of Morrisville, Pennsylvania, USA, for example, HMS-H271, HMS-071, HMS-993, HMS-301, HMS-301 R, HMS-031, HMS-991, HMS-992, HMS-993, HMS-082, HMS-151, HMS-013, HMS-053, HAM-301, and HMS-HM271.

The polyorganohydrogensiloxane selected for use in the silicone pressure sensitive adhesive composition may be one polyorganohydrogensiloxane or may comprise more than one polyorganohydrogensiloxane, where the polyorganohydrogensiloxanes differ in at least one property such as molecular weight, selection of alkyl groups, type of terminal siloxane units, and sequence of the siloxane units in the polymer backbone. Starting materials (A), (B), and (C) are present in amounts sufficient to provide a molar ratio of silicon bonded hydrogen atoms in starting material (C) to alkenyl groups in starting materials (A) and (B) of 10:1 to 50:1, alternatively 15:1 to 45:1, alternatively 20:1 to 40:1, and alternatively 25:1 to 35:1.

(D) Polydialkylcyclosiloxane

Starting material (D) is a low molecular weight cyclic siloxane. More specifically, starting material (D) is a polydialkylcyclosiloxane selected from the group consisting of: (d1) an octaalkylcyclotetrasiloxane of unit formula $(R^1_2SiO_{2/2})_4$, (d2) a decaaalkylcyclopentasiloxane of unit formula $(R^1_2SiO_{2/2})_5$, (d3) a dodecaalkylcyclohexasiloxane of unit formula $(R^1_2SiO_{2/2})_6$, and (d4) combinations of two or more of (d1), (d2), and (d3), where $R^1$ is an alkyl group as described above.

The amount of starting material (d1) in the composition may be 0.18 to 8.0 weight parts, alternatively 0.27 to 8.0 weight parts, and alternatively 0.18 weight parts to 4.01 weight parts, per 100 weight parts of starting material (A). Alternatively, the amount of starting material (d1) may be at least 0.18 weight part, alternatively at least 0.27 weight part, alternatively at least 0.30 weight part, alternatively at least 0.33 weight part, and alternatively at least 0.35 weight part, per 100 parts by weight of starting material (A). At the same time, the amount of (d1) may be up to 8.0 weight parts, alternatively up to 7.5 weight parts, alternatively up to 7.0 weight parts, alternatively up to 6.5 weight parts, alternatively up to 6.0 weight parts, alternatively up to 5.5 weight parts, alternatively up to 5.0 weight parts, alternatively up to 4.5 weight parts, alternatively up to 4.1 weight parts, alternatively up to 4.01 weight parts, and alternatively up to 4.0 weight parts, per 100 parts by weight of starting material (A).

The amount of starting material (d2) in the composition may be 0.17 to 8.8 weight parts, alternatively 0.17 to 4.43 weight parts, and alternatively 0.39 weight part to 8.8 weight parts, per 100 weight parts of starting material (A). Alternatively, the amount of starting material (d2) may be at least 0.17 weight part, alternatively at least 0.39 weight part, alternatively at least 0.41 weight part, alternatively at least 0.43 weight part, alternatively at least 0.45 weight part, alternatively at least 0.47 weight part, alternatively at least 0.49 weight part, and alternatively at least 0.51 weight part, per 100 weight parts of starting material (A). At the same time, the amount of (d2) may be up to 8.8 weight parts, alternatively up to 8.5 weight parts, alternatively up to 8.0 weight parts, alternatively up to 7.5 weight parts, alternatively up to 7.0 weight parts, alternatively up to 6.5 weight parts, alternatively up to 6.0 weight parts, alternatively up to 5.5 weight parts, alternatively up to 5.0 weight parts, alternatively up to 4.5 weight parts, alternatively up to 4.43 weight parts, and alternatively up to 4.4 weight parts, per 100 weight parts of starting material (A).

The amount of starting material (d3) in the composition may be 0.16 to 5.0 weight parts, alternatively 0.26 weight part to 5.0 weight parts, and alternatively 0.16 to 1.02 weight parts, per 100 weight parts of starting material (A). Alternatively, the amount of starting material (d3) may be at least 0.16 weight part, alternatively at least 0.26 weight parts, alternatively at least 0.28 weight parts, alternatively at least 0.30 weight parts, alternatively at least 0.32 weight parts, alternatively at least 0.33 weight parts, and alternatively at least 0.34 weight parts, per 100 weight parts of starting material (A). At the same time, the amount of (d3) may be up to 5.0 weight parts, alternatively up to 4.5 weight parts, alternatively up to 4.4 weight parts, alternatively up to 4.0 weight parts, alternatively up to 3.5 weight parts, alternatively up to 3.0 weight parts, alternatively up to 2.5 weight parts, alternatively up to 2.4 weight parts, alternatively up to 2.3 weight parts, and alternatively 1.02 weight parts, per 100 weight parts of starting material (A).

The total amount of starting material (D) the polydialkylcyclosiloxane, i.e., the combined amounts of (d1), (d2) and/or (d3) in the composition is 0.91 to 17.2 parts by weight, per 100 parts by weight of starting material (A). Alternatively, the total amount of starting material (D) may be at least 0.91 weight part, alternatively at least 0.93 weight part, alternatively at least 0.95 weight part, alternatively at least 0.97 weight part, alternatively at least 0.99 weight part, alternatively at least 1.0 weight part, alternatively at least 1.1 weight parts, and alternatively at least 1.2 weight parts, per 100 weight parts of starting material (A). At the same time, the total amount of starting material (D) may be up to 17.2 weight parts, alternatively up to 17 weight parts, alternatively up to 16 weight parts, alternatively up to 15 weight parts, alternatively up to 14 weight parts, alternatively up to 13 weight parts, alternatively up to 12 weight parts, alternatively up to 11 weight parts, alternatively up to 10 weight parts, alternatively up to 9 weight parts, alternatively up to 8.9 weight parts, alternatively up to 8.8 weight parts, alternatively up to 8.5 weight parts, and alternatively up to 8 weight parts, per 100 weight parts of starting material (A).

Polydialkylcyclosiloxanes are known in the art and are commercially available. For example, octaalkylcyclotetrasiloxanes such as 2,2,4,4,6,6,8,8,-octamethylcyclotetrasiloxane; decaaalkylcyclopentasiloxanes such as 2,2,4,4,6,6,8,8,-decamethylcyclopentasiloxane; and dodecaalkylcyclohexasiloxanes such as 2,2,4,4,6,6,8,8,10,10-dodecamethylcyclohexasiloxane are known in the art and are commercially available from various sources such as Dow Silicones Corporation of Midland, Michigan, USA; Gelest, Inc. of Morrisville, Pennsylvania, USA; and Millipore Sigma of St. Louis, Missouri, USA.

The inventors surprisingly found that curing the silicone pressure sensitive adhesive composition described herein, which includes (D) the polydialkylcyclosiloxane described above, formed a silicone pressure sensitive adhesive with reduced stain visible to human eyes after removal of the silicone pressure sensitive adhesive from various adherends, as described below in the Examples herein. This was particularly surprising in view of previous disclosures, e.g., in U.S. Pat. Nos. 3,983,298; 7,728,080; and 8,754,174; all of which disclose removing low molecular weight cyclic siloxanes from the starting materials used to make pressure sensitive adhesive compositions.

(E) Hydrosilylation Reaction Catalyst

Hydrosilylation reaction catalysts are known in the art and are commercially available. Hydrosilylation reaction catalysts include platinum group metal catalysts. Such hydrosilylation reaction catalysts can be E1) a metal selected from platinum, rhodium, ruthenium, palladium, osmium, and iridium. Alternatively, the hydrosilylation reaction catalyst may be E2) a compound of such a metal, for example, chloridotris(triphenylphosphane)rhodium(I) (Wilkinson's Catalyst), a rhodium diphosphine chelate such as [1,2-bis(diphenylphosphino)ethane]dichlorodirhodium or [1,2-bis(diethylphospino)ethane]dichlorodirhodium, chloroplatinic acid (Speier's Catalyst), chloroplatinic acid hexahydrate, platinum dichloride, and E3) a complex of a compound, E2), with a low molecular weight organopolysiloxane, or E4) a platinum group metal compound microencapsulated in a matrix or coreshell type structure. Complexes of platinum with low molecular weight organopolysiloxanes include 1,3-diethenyl-1,1,3,3-tetramethyldisiloxane complexes with platinum (Karstedt's Catalyst) and Pt(0) complex in tetramethyltetravinylcyclotetrasiloxane (Ashby's Catalyst). Alternatively, the hydrosilylation reaction catalyst may be E5) a compound or complex, as described above, microencapsulated in a resin matrix. Specific examples of platinum-containing catalysts include chloroplatinic acid, either in hexahydrate form or anhydrous form, or a platinum-containing catalyst which is obtained by a method comprising reacting chloroplatinic acid with an aliphatically unsaturated organosilicon compound such as divinyltetramethyldisiloxane, or alkene-platinum-silyl complexes as described in U.S. Pat. No. 6,605,734 to Roy. These alkene-platinum-silyl complexes may be prepared, for example by mixing 0.015 mole (COD)PtCl$_2$ with 0.045 mole COD and 0.0612 moles HMeSiCl$_2$, where COD represents cyclooctadiene and Me represents methyl. Other exemplary hydrosilylation reaction catalysts are described in U.S. Pat. No. 2,823,218 to Speier; U.S. Pat. No. 3,159,601 to Ashby; U.S. Pat. No. 3,220,972 to Lamoreaux; U.S. Pat. No. 3,296,291 to Chalk, et al.; U.S. Pat. No. 3,419,593 to Willing; U.S. Pat. No. 3,516,946 to Modic; U.S. Pat. No. 3,814,730 to Karstedt; U.S. Pat. No. 3,928,629 to Chandra; U.S. Pat. No. 3,989,668 to Lee, et al.; U.S. Pat. No. 4,766,176 to Lee, et al.; U.S. Pat. No. 4,784,879 to Lee, et al.; U.S. Pat. No. 5,017,654 to Togashi; U.S. Pat. No. 5,036,117 to Chung, et al.; and U.S. Pat. No. 5,175,325 to Brown; and EP 0 347 895 A to Togashi, et al. Hydrosilylation reaction catalysts are commercially available, for example, SYL-OFF™ 4000 Catalyst and SYL-OFF™ 2700 are available from Dow Silicones Corporation.

The amount of catalyst in the composition will depend on various factors including the selection of starting materials A), B), and C) and their respective contents of alkenyl groups and silicon bonded hydrogen atoms, and the amount of F) hydrosilylation reaction inhibitor present in the composition, however, the amount of catalyst is sufficient to catalyze hydrosilylation reaction of SiH and alkenyl groups, alternatively the amount of catalyst is sufficient to provide 10 ppm to 75000 ppm of the platinum group metal based on combined weights of starting materials A), B), C), D), E), and F).

(F) Hydrosilylation Reaction Catalyst Inhibitor

Starting material (F) is a hydrosilylation reaction inhibitor (inhibitor) that can be used for altering rate of reaction of the silicon bonded hydrogen atoms of starting material (C) and the alkenyl groups of starting materials (A) and (B), as compared to reaction rate of the same starting materials but with the inhibitor omitted. Inhibitors are exemplified by acetylenic alcohols such as methyl butynol, ethynyl cyclohexanol, dimethyl hexynol, and 3,5-dimethyl-1-hexyn-3-ol, 1-butyn-3-ol, 1-propyn-3-ol, 2-methyl-3-butyn-2-ol, 3-methyl-1-butyn-3-ol, 3-methyl-1-pentyn-3-ol, 3-phenyl-1-butyn-3-ol, 4-ethyl-1-octyn-3-ol, 3,5-dimethyl-1-hexyn-3-ol, and 1-ethynyl-1-cyclohexanol, and a combination thereof; olefinic siloxanes such as cycloalkenylsiloxanes exemplified by methylvinylcyclosiloxanes exemplified by 1,3,5,7-tetramethyl-1,3,5,7-tetravinylcyclotetrasiloxane, 1,3,5,7-tetramethyl-1,3,5,7-tetrahexenylcyclotetrasiloxane, and a combination thereof; ene-yne compounds such as 3-methyl-3-penten-1-yne, 3,5-dimethyl-3-hexen-1-yne, and a combination thereof; triazoles such as benzotriazole; phosphines; mercaptans; hydrazines; amines, such as tetramethyl ethylenediamine, 3-dimethylamino-1-propyne, n-methyl-propargylamine, propargylamine, and 1-ethynylcyclohexylamine; dialkyl fumarates such as diethyl fumarate, dialkenyl fumarates such as diallyl fumarate, dialkoxyalkyl fumarates, maleates such as diallyl maleate and diethyl maleate; nitriles; ethers; carbon monoxide; alkenes such as cyclooctadiene, divinyltetramethyldisiloxane; alcohols such as benzyl alcohol; and a combination thereof. Exemplary olefinic siloxanes are disclosed, for example, in U.S. Pat. No. 3,989,667. Exemplary acetylenic alcohols are disclosed, for example, in U.S. Pat. No. 3,445,420.

Alternatively, the inhibitor may be a silylated acetylenic compound. Without wishing to be bound by theory, it is thought that adding a silylated acetylenic compound reduces yellowing of the reaction product prepared from hydrosilylation reaction as compared to a reaction product from hydrosilylation of starting materials that do not include a silylated acetylenic compound or that include an organic acetylenic alcohol inhibitor, such as those described above.

The silylated acetylenic compound is exemplified by (3-methyl-1-butyn-3-oxy)trimethylsilane, ((1,1-dimethyl-2-propynyl)oxy)trimethylsilane, bis(3-methyl-1-butyn-3-oxy)dimethylsilane, bis(3-methyl-1-butyn-3-oxy)silanemethylvinylsilane, bis((1,1-dimethyl-2-propynyl)oxy)dimethylsilane, methyl(tris(1,1-dimethyl-2-propynyloxy))silane, methyl(tris(3-methyl-1-butyn-3-oxy))silane, (3-methyl-1-butyn-3-oxy)dimethylphenylsilane, (3-methyl-1-butyn-3-oxy)dimethylhexenylsilane, (3-methyl-1-butyn-3-oxy)triethylsilane, bis(3-methyl-1-butyn-3-oxy)methyltrifluoropropylsilane, (3,5-dimethyl-1-hexyn-3-oxy)trimethylsilane, (3-phenyl-1-butyn-3-oxy)diphenylmethylsilane, (3-phenyl-1-butyn-3-oxy)dimethylphenylsilane, (3-phenyl-1-butyn-3-oxy)dimethylvinylsilane, (3-phenyl-1-butyn-3-oxy)dimethylhexenylsilane, (cyclohexyl-1-ethyn-1-oxy)dimethylhexenylsilane, (cyclohexyl-1-ethyn-1-oxy)dimethylvinylsilane, (cyclohexyl-1-ethyn-1-oxy)diphenylmethylsilane, (cyclohexyl-1-ethyn-1-oxy)trimethylsilane, and combinations thereof. Alternatively, the silylated acetylenic compound is exemplified by methyl(tris(1,1-dimethyl-2-propynyloxy))silane, ((1,1-dimethyl-2-propynyl)oxy)trimethylsilane, or a combination thereof. The silylated acetylenic compound useful as the inhibitor herein may be prepared by methods known in the art, for example, U.S. Pat. No. 6,677,407 to Bilgrien, et al. discloses silylating an acetylenic alcohol described above by reacting it with a chlorosilane in the presence of an acid receptor.

The amount of inhibitor in the composition will depend on various factors including the desired reaction rate, the particular inhibitor used, and the selection and amount of starting materials (A), (B), and (C). However, when present, the amount of inhibitor may be 0.1 to 5 parts by weight, per 100 parts by weight of starting material (A).

(G) Organic Solvent

Starting material (G) in the composition is an organic solvent. The organic solvent can be an alcohol such as methanol, ethanol, isopropanol, butanol, or n-propanol; a ketone such as acetone, methylethyl ketone, or methyl isobutyl ketone; an aromatic hydrocarbon such as benzene, toluene, or xylene; an aliphatic hydrocarbon such as hexane, heptane, or octane; a glycol ether such as propylene glycol methyl ether, dipropylene glycol methyl ether, propylene glycol n-butyl ether, propylene glycol n-propyl ether, or ethylene glycol n-butyl ether, tetrahydrofuran; mineral spirits; naphtha; ethyl acetate; or a combination thereof.

The amount of solvent will depend on various factors including the type of solvent selected and the amount and type of other starting materials selected for the composition. However, the amount of solvent may be 10% to 90%, alternatively 20% to 80%, alternatively 30% to 70%, and alternatively 40% to 60%, based on combined weights of all starting materials in the composition. The solvent may be added during preparation of the composition, for example, to aid mixing and delivery of one or more starting materials. For example, the gum, the resin and/or the catalyst may be delivered in a solvent. The solvent may be one solvent or a combination of two or more different solvents. For example, certain catalysts (e.g., chloroplatinic acid) may be dissolved in an alcohol solvent and the gum and/or the resin may be dissolved in a different solvent, such as toluene.

The composition may be free of filler or contain only a limited amount of filler, such as 0 to 30% by weight of the composition. Without wishing to be bound by theory, it is thought that fillers can agglomerate or otherwise stick to the coater equipment used to apply the composition to a substrate. Fillers can also hinder optical properties by creating haze of the pressure sensitive adhesive and protective film formed therewith. Furthermore, the composition may be free of other components which would hinder optical properties, such as by increasing haze. Without wishing to be bound by theory, it is thought that hydroxyl-functional polydiorganosiloxane gum may contribute to haze and/or migration of the pressure sensitive adhesive. It is further thought that certain low molecular weight side-products formed inherently during the manufacture of polyorganosilicate resins, such as neopentamer, may also contribute to haze and/or migration of the pressure sensitive adhesive. Therefore, the composition may also be free of neopentamer.

Method for Making the Silicone Pressure Sensitive Adhesive Composition

The pressure sensitive adhesive composition can be prepared by a method comprising combining all starting materials by any convenient means such as mixing at ambient or elevated temperature. The inhibitor may be added before the hydrosilylation reaction catalyst, for example, when the pressure sensitive adhesive composition will be prepared at elevated temperature and/or the composition will be prepared as a one part composition. One or more of the starting materials may optionally be devolatilized before their addition to the pressure sensitive adhesive composition. For example, (A) the gum and/or (B) the resin may be stripped (if not previously devolatilized), optionally with vacuum and/or inert gas flow, to remove any volatile by-products of manufacture before their use in the pressure sensitive adhesive composition. The (B) resin and all or a portion of the (A) gum may be combined, e.g., using a devolatilizing extruder, before adding the resulting resin/gum blend to the remaining starting materials of the composition.

The method may further comprise delivering one or more starting materials in a solvent. For example, the gum, the resin and/or the hydrosilylation reaction catalyst may be dissolved in a solvent when combined with one or more of the other starting materials in the composition. Alternatively, the resin may be prepared as a solid flake or powder, optionally combined with a portion of the gum, and thereafter the resin or the resin/gum combination may be dissolved in solvent before combining with the other starting materials of the composition.

Alternatively, the pressure sensitive adhesive composition may be prepared as a multiple part composition, for example, when the pressure sensitive adhesive composition will be stored for a long period of time before use, e.g., up to 6 hours before coating the pressure sensitive adhesive composition on a substrate. In the multiple part composition, the hydrosilylation reaction catalyst is stored in a separate part from any starting material having a silicon bonded hydrogen atom, for example the polyorganohydrogensiloxane, and the parts are combined shortly before use of the pressure sensitive adhesive composition.

For example, a multiple part composition may be prepared by combining starting materials comprising at least some of the gum, the polyorganohydrogensiloxane, at least some of the solvent, and optionally one or more other additional starting materials described above to form a base part, by any convenient means such as mixing, with the proviso that the hydrosilylation reaction catalyst is not included in the base part. A curing agent may be prepared by combining starting materials comprising at least some of the gum, the hydrosilylation reaction catalyst, solvent and optionally one or more other additional starting materials described above by any convenient means such as mixing, with the proviso that any starting material with silicon bonded hydrogen atoms (such as the polyorganohydrogensiloxane) is not included in the curing agent part. The starting materials may be combined at ambient or elevated temperature. The hydrosilylation reaction inhibitor may be included in one or more of the base part, the curing agent part, or a separate additional part. Alternatively, the polyorganosilicate resin may be added to the base part, the curing agent part, or a separate additional part. The polydialkylcyclosiloxane may be added to the base part, the curing agent part, or a separate additional part. When a two part composition is used, the weight ratio of amounts of base part to curing agent part may range from 1:1 to 10:1. The pressure sensitive adhesive composition will cure via hydrosilylation reaction to form a pressure sensitive adhesive.

Method of Use

The method described above may further comprise one or more additional steps. The pressure sensitive adhesive composition prepared as described above may be used to form an adhesive article, e.g., a pressure sensitive adhesive (prepared by curing the pressure sensitive adhesive composition described above) on a substrate. The method may, therefore, further comprise applying the pressure sensitive adhesive composition to a substrate.

Applying the pressure sensitive adhesive composition to the substrate can be performed by any convenient means. For example, the pressure sensitive adhesive curable composition may be applied onto a substrate by gravure coater, comma coater, offset coater, offset-gravure coater, roller coater, reverse-roller coater, air-knife coater, or curtain coater.

The substrate can be any material that can withstand the curing conditions (described below) used to cure the pressure sensitive adhesive composition to form the pressure sensitive adhesive on the substrate. For example, any substrate that can withstand heat treatment at a temperature equal to or greater than 70° C., alternatively, 70° C. to 150° C. is suitable. Examples of materials suitable for such substrates including plastic films such as polyimide (PI), polyetheretherketone (PEEK), polyethylene naphthalate (PEN), liquid-crystal polyarylate, polyamideimide (PAI), polyether sulfide (PES), polyethylene terephthalate (PET), polyethylene (PE), or polypropylene (PP). Alternatively, the substrate may be a metal foil such as aluminum foil or copper foil. The thickness of the substrate is not critical, however, the thickness may be 5 micrometers to 300 micrometers.

To improve bonding of the pressure sensitive adhesive to the substrate, the method for forming the adhesive article may optionally further comprise treating the substrate before applying the pressure sensitive adhesive composition. Treating the substrate may be performed by any convenient means, such as applying a primer, or subjecting the substrate to corona-discharge treatment, etching, or plasma treatment before applying the pressure sensitive adhesive composition to the substrate.

An adhesive article such as a film or tape may be prepared by applying the pressure sensitive adhesive curable composition described above onto the substrate described above. The method may optionally further comprise removing all, or a portion, of the solvent before and/or during curing. Removing solvent may be performed by any convenient means, such as heating at a temperature that vaporizes the solvent without fully curing the pressure sensitive adhesive composition, e.g., heating at a temperature of 70° C. to 120° C., alternatively 50° C. to 100° C., and alternatively 70° C. to 80° C. for a time sufficient to remove all or a portion of the solvent (e.g., 30 seconds to 1 hour, alternatively 1 minute to 5 minutes).

Curing the pressure sensitive adhesive composition may be performed by heating at a temperature of 70° C. to 200° C., alternatively 80° C. to 180° C., and alternatively 90° C. to 160° C., and alternatively 100° C. to 150° C. for a time sufficient to cure the pressure sensitive adhesive composition (e.g., for 30 seconds to an hour, alternatively 1 to 5 minutes). If cure speed needs to be increased or the process oven temperatures lowered, the catalyst level can be increased. This forms a pressure sensitive adhesive on the substrate. Curing may be performed by placing the substrate in an oven. The amount of the pressure sensitive adhesive composition to be applied to the substrate depends on the specific application, however, the amount may be sufficient such that after curing thickness of the pressure sensitive adhesive may be 1 micrometers to 100 micrometers, and for protective film the thickness may be 3 micrometers to 80 micrometers, and alternatively 4 micrometers to 50 micrometers.

The method described herein may optionally further comprise applying a removable release liner to the pressure sensitive adhesive opposite the substrate, e.g., to protect the pressure sensitive adhesive before use of the adhesive article. The release liner may be applied before, during or after curing the pressure sensitive adhesive composition; alternatively after curing.

The adhesive article prepared as described above is suitable for use as a protective film, e.g., for protection of exteriors of appliances, which may comprise plastic, metal such as copper or stainless steel, and/or glass. For example, a method for protecting an appliance, exemplified by a frame and back plate of a home appliance, may comprise applying a protective film (i.e., an adhesive article comprising the pressure sensitive adhesive prepared as described herein) to a surface of the appliance. The method further comprises removing the protective film after storage and shipping the device. The protective film may be removed with no or minimal stain on the surface of the appliance.

In an alternative embodiment, the adhesive article prepared as described above may be used for surface protection of an electronic device, such as screen or other surface protection during assembly of the device, storage of the device, shipment of the device, such as a smartphone or tablet, or at an end user for screen protection of such a device. The pressure sensitive adhesive and substrate selected are typically transparent for screen protection applications. The adhesive article may be removed without damaging the electronic device after storage and shipping.

EXAMPLES

These examples are intended to illustrate the invention to one skilled in the art and should not be interpreted to limit the scope of the invention set forth in the claims. Starting materials used in these examples are described below in Table 1.

TABLE 1

Starting Materials

| Starting Material | Chemical Description | Source |
|---|---|---|
| A-1 | Dimethylvinylsiloxy-terminated, poly(dimethyl/methylvinyl)siloxane with a vinyl content of 0.0669 weight % and Mn of 702,000 Da | DSC |
| A-2 | Dimethylvinylsiloxy-terminated, poly(dimethyl/methylvinyl)siloxane with a vinyl content of 0.0654 weight % and Mn of 700,000 Da | DSC |
| B-1 | Polymethylsilicate resin comprising M units of formula ($Me_3SiO_{1/2}$), Q units of formula ($SiO_{4/2}$) and hydroxyl content ($HO_{1/2}$), where molar ratio of the M:Q units was 0.9:1 to 1.1:1, Mw was 17,000 Da, Mn was 6,200 to 6,900, and the hydroxyl content was 0.9 to 1.1 weight % based on weight of the resin. | DSC |
| C-1 | Trimethylsiloxy-terminated polymethylhydrogensiloxane homopolymer with a DP of 36 | DSC |
| D-1 | 1,1,1,3,3,5,5,7,7,7-dodecamethylpentasiloxane with viscosity of 2 cSt | DSC |
| D-2 | Trimethylsiloxy terminated polydimethylsiloxane with viscosity of 5 cSt | DSC |
| D-3 | Trimethylsiloxy terminated polydimethylsiloxane with viscosity of 10 cSt | DSC |
| D4 | 2,2,4,4,6,6-octamethylcyclotetrasiloxane | DSC |
| D5 | 2,2,4,4,6,6,8,8-decamethylcyclopentasiloxane | DSC |
| D6 | 2,2,4,4,6,6,8,8,10,10-dodecamethylcyclohexasiloxane | DSC |
| D-7 | Trimethylsiloxy terminated poly(dimethylsiloxane-co-methylphenylsiloxane) with viscosity of 50 cSt | DSC |
| D-8 | 1,1,1,3,3,3-hexamethyldisiloxane | DSC |
| D-9 | 1,1,1,3,3,5,5,5-octamethyltrisiloxane | DSC |
| E-1 | Platinum-vinylmethylpolysiloxane complex | SYL-OFF™ 4000 catalyst from DSC |
| F-1 | 1-ethynyl-1-cyclohexanol | BASF |
| G-1 | Toluene | SK Chemical |

In Table 1, DSC refers to Dow Silicones Corporation of Midland, Michigan, USA.

Comparative Example 0 (Run 0)

A silicone pressure sensitive adhesive composition, which included a hydroxyl-functional polydiorganosiloxane gum, was prepared according to U.S. Pat. No. 8,178,207. This composition was coated on a substrate and cured according to Reference Example 2, described below. The resulting pressure sensitive adhesive sheet was evaluated according to Reference Examples 3-7 below. The pressure sensitive adhesive in this comparative example failed the discoloration test in Reference Example 7.

Reference Example 1—Sample Preparation 100 parts by weight of a dimethylvinylsiloxy-terminated, poly(dimethyl/methylvinyl)siloxane gum (A-1 and/or A-2 in Table 1), was mixed with polymethylsilicate resin (B-1) and (G-1) toluene to form a 41% solution. To the solution were added a polydimethylsiloxane additive (one or more of D-1 to D-9 in Table 1). Inhibitor (ETCH) (F-1) was added, and the resulting combination was mixed well. The catalyst (E-1) was then added in an amount targeting 115 ppm of platinum in the mixture. The composition of each sample (Run) is shown below in Tables 2 and 3.

TABLE 2

Silicone Pressure Sensitive Adhesive Compositions

| Starting Material from Table 1 or Calculated Parameter | Run-1 (C) | Run-2 (W) | Run-3 (C) | Run-4 (C) | Run-5 (C) | Run-6 (C) | Run-7 (C) | Run-8 (C) |
|---|---|---|---|---|---|---|---|---|
| A-2 | 100.00 | 100.00 | 100.00 | 100.00 | 100.00 | 100.00 | 100.00 | 100.00 |
| B-1 | 88.96 | 88.96 | 88.96 | 88.96 | 88.96 | 88.96 | 88.96 | 88.96 |
| D4 | 0.033 | 0.667 | 0.033 | 0.033 | 0.033 | 0.033 | 0.033 | 0.033 |
| D5 | 0.071 | 0.754 | 0.071 | 0.071 | 0.071 | 0.071 | 0.071 | 0.071 |
| D6 | 0.063 | 2.354 | 0.063 | 0.063 | 0.063 | 0.063 | 0.063 | 0.063 |
| D-8 | 0 | 0 | 3.44 | 0 | 0 | 0 | 0 | 0 |
| D-9 | 0 | 0 | 0 | 3.44 | 0 | 0 | 0 | 0 |
| D-1 | 0 | 0 | 0 | 0 | 3.44 | 0 | 0 | 0 |
| D-2 | 0 | 0 | 0 | 0 | 0 | 3.44 | 0 | 0 |
| D-3 | 0 | 0 | 0 | 0 | 0 | 0 | 3.44 | 0 |
| D-7 | 0 | 0 | 0 | 0 | 0 | 0 | 0 | 3.44 |
| C-1 | 4.61 | 4.61 | 4.61 | 4.61 | 4.61 | 4.61 | 4.61 | 4.61 |
| F-1 | 0.74 | 0.74 | 0.74 | 0.74 | 0.74 | 0.74 | 0.74 | 0.74 |
| E-1 | 4.61 | 4.61 | 4.61 | 4.61 | 4.61 | 4.61 | 4.61 | 4.61 |
| G-1 | 272.11 | 272.11 | 272.11 | 272.11 | 272.11 | 272.11 | 272.11 | 272.11 |
| Resin/Gum ratio | 0.89 | 0.89 | 0.89 | 0.89 | 0.89 | 0.89 | 0.89 | 0.89 |
| SiH/Vi ratio (excluding Pt) | 30.45 | 30.45 | 30.45 | 30.45 | 30.45 | 30.45 | 30.45 | 30.45 |
| Pt content (ppm) | 115.82 | 115.82 | 115.82 | 115.82 | 115.82 | 115.82 | 115.82 | 115.82 |
| D4/D5/D6 content (g) | 0.167 | 3.775 | 0.167 | 0.167 | 0.167 | 0.167 | 0.167 | 0.167 |

TABLE 3

Silicone Pressure Sensitive Adhesive Compositions (continued)

| Starting Material or Calculated Parameter | Run 9 (C) | Run 10 (W) | Run 11 (W) | Run 12 (W) | Run 13 (C) | Run 14 (W) | Run 15 (W) | Run 16 (W) | Run 17 (C) |
|---|---|---|---|---|---|---|---|---|---|
| A-1 | 47.29 | 66.39 | 95.25 | 0 | 0 | 0 | 0 | 0 | 0 |
| A-2 | 52.71 | 33.61 | 4.75 | 100.00 | 100.00 | 100.00 | 100.00 | 100.00 | 100.00 |
| B-1 | 89.59 | 89.84 | 90.22 | 88.96 | 88.96 | 88.96 | 88.96 | 88.96 | 88.96 |
| D4 | 0.262 | 0.354 | 0.494 | 0.667 | 0.667 | 1.035 | 2.036 | 4.040 | 8.046 |
| D5 | 0.386 | 0.513 | 0.705 | 0.754 | 0.754 | 1.173 | 2.275 | 4.479 | 8.886 |
| D6 | 0.258 | 0.337 | 0.456 | 0.333 | 5.071 | 0.333 | 0.333 | 0.333 | 0.333 |
| C-1 | 4.64 | 4.66 | 4.68 | 4.61 | 4.61 | 4.61 | 4.61 | 4.61 | 4.61 |
| F-1 | 0.74 | 0.74 | 0.75 | 0.74 | 0.74 | 0.74 | 0.74 | 0.74 | 0.74 |
| E-1 | 4.64 | 4.66 | 4.68 | 4.61 | 4.61 | 4.61 | 4.61 | 4.61 | 4.61 |
| G-1 | 274.02 | 274.79 | 275.96 | 272.11 | 272.11 | 272.11 | 272.11 | 272.11 | 272.11 |
| Resin/Gum ratio | 0.89 | 0.89 | 0.89 | 0.89 | 0.89 | 0.89 | 0.89 | 0.89 | 0.89 |
| SiH/Vi ratio (excluding Pt) | 30.12 | 29.99 | 29.80 | 30.45 | 30.45 | 30.45 | 30.45 | 30.45 | 30.45 |
| Pt content (ppm) | 115.82 | 115.82 | 115.82 | 115.82 | 115.82 | 115.82 | 115.82 | 115.82 | 115.82 |
| D4/D5/D6 content (g) | 0.906 | 1.204 | 1.655 | 1.754 | 6.492 | 2.541 | 4.645 | 8.852 | 17.266 |

In Tables 2 and 3, (C) denotes a comparative example, and (W) denotes a working example.

Reference Example 2—Si PSA Coating and Cure

The silicone-based pressure-sensitive adhesive compositions prepared as described above were applied onto a 25 um PET film sold under the trade name of SK Chemical (SKC). A pressure-sensitive adhesive layer which after curing had a thickness of 30 um was formed by heating the coated film for 2 min at 100° C. with 1000 rpm of wind speed. A pressure sensitive adhesive sheet was formed.

Reference Example 3—Initial Adhesion Measurement

Pressure sensitive adhesive strips were formed by cutting the pressure sensitive adhesive sheets prepared according to Reference Example 2 into 1 inch-wide strips. Each strip was adhered under pressure of 2 kgf developed by rubber rollers to an adherend in the form of a mirror-surface stainless steel plate (SUS304) to form test specimens. Adhesion strength of the strips to the stainless-steel plate (SUS304) was measured according to a 180-degree peel test specified in ASTM D1000.

Reference Example 4—Adhesion Measurement for Aged Condition at 85° C./85% of Humidity (Adhesion Stability)

Samples were prepared as described above in Reference Example 3, except the test specimens were aged for 1 day (24 hr) in an oven at 85° C./85% moisture. After cooling to room temperature, the adhesion force was measured according to the same 180-degree peel test specified in ASTM D1000 as in Reference Example 3.

Reference Example 5—Probe Tack Test

An adhesive layer prepared as described in Reference Example 2 showed tackiness to a surface of stainless column measured according to probe tack test specified in ASTM D 2979. The pressure sensitive adhesive sheets were cut to obtain sheet into 1 inch-wide strips. A probe in the shape of a cylinder was brought into contact with a test specimen to which a strip was attached, and the tack property (instantaneous adhesion) that occurred when it was peeled at 0.5 cm/sec of speed with 1 sec of dwell time was evaluated.

Reference Example 6—Migration Check Under Aged Condition at 60° C./90% of Humidity (Stain Test)

Stain of the pressure sensitive adhesives prepared as described in Reference Example 2 were evaluated as follows. Pressure sensitive adhesive sheets were cut to obtain sheet into 2 inch-wide strips, and then each strip was attached on a surface of a target adherend (polycarbonate) to create a test specimen.

The test specimen was kept at 60° C./90% of humidity condition for 3 days and then cooled down to room temperature condition. The strips were peeled off from the adherends, and then the position where the pressure sensitive adhesive contacted the adherend was visually inspected by naked eyes to determine whether the pressure sensitive adhesive created a stain remaining on the adherend. If a strong stain remained on the surface, it was scored to 5. If a faint or no stain remained on the surface, it was scored to 1. Results for each sample (Run) are also shown below in Tables 4. 'Fail' in Table 4 denotes worse stain and is undesirable for certain applications such as the protective film application described herein.

Reference Example 7—Migration Check Under Post Cure Condition at 200° C. (Discoloration Test)

Stain called as 'Discoloration' of the pressure sensitive adhesives prepared as described in reference Example 2 was evaluated follows and the test method is referred to 'A CIELAB color space' specified in ASTM D2244. Pressure sensitive adhesive tapes were obtained by cutting a sheet prepared as described in Reference Example 2 into 2 inch-wide strips, and then the strips were attached on a surface of a copper film to form test specimens. The test specimens were kept at 200° C. for 10 mins and then cooled to room temperature. The strips were peeled off from the copper film, and then the residue of silicone was measured by Spectrometer called as hazy meter on reflective mode. Once silicone residue called as migration remained on the surface of Cu film, the surface color of Cu film was changed to be getting low brightness and red brown. This discoloration is correlated with silicone migration strength how much silicone residue remained on the surface of Cu film and the variation of color is correlated to each value of $\Delta T^*$, $\Delta a^*$, $\Delta b^*$ and delta E. $\Delta L^*$ means a variation of lightness between Cu film having silicone residue and Cu film as reference. If the value is getting negative, it correlated with low brightness caused by silicone migration. $\Delta a^*$ represents the variation of red color between Cu film having silicone residue and Cu film as reference. If the value if getting positive, it is correlated with strong red color of Cu film changed by silicone migration. $\Delta b^*$ represents the variation of yellow color between Cu film having silicone residue and Cu film as reference. If the value is getting positive, the color of Cu film is changed to more yellow due to strong silicone migration. $\Delta E$ is the deviation of $\Delta L^*$, $\Delta a^*$ and $\Delta b^*$ from reference to determine how much stain remained on surface of Cu film is through comparing each optical index, L*, a* and b*. If $\Delta E$ is getting positive, the Cu film having strong stain or discoloration caused by silicone migration.

The value of each index is calculated following below formula and the result for each sample are shown in Table 4.

$$\Delta L^*, L^*_{example} - L^*_{Cu\,film} \quad \text{Formula (1):}$$

$$\Delta a^*, a^*_{example}\, a^*_{Cu\,film} \quad \text{Formula (2):}$$

$$\Delta b^*, b^*_{example}\, b^*_{Cu\,film} \quad \text{Formula (3):}$$

$$\Delta E^* = \sqrt{(\Delta L^*)^2 + (\Delta a^*)^2 + (\Delta b^*)^2} \quad \text{Formula (4):}$$

TABLE 4

Test Results of Reference Examples 3 to 7

| Run | Initial Adhesion Strength (gf/in) | Adhesion Build up - 24 h (gf/in) | Probe Tack | Stain (Pass/Fail) | Visual Stain Score | The deviation of discoloration (delta E) |
|---|---|---|---|---|---|---|
| 0 (C) | 173.7 | 382.2 | 131.1 | Pass | 1.5 | 4.65 |
| 1 (C) | 169.7 | 364.3 | 120.0 | Fail | 4.3 | 1.69 |
| 2 (W) | 164.0 | 364.7 | 131.4 | Pass | 1.5 | 1.96 |
| 3 (C) | 154.4 | 320.0 | 111.0 | Fail | 3.8 | N/D |
| 4 (C) | 141.9 | 317.7 | 128.8 | Fail | 4.0 | N/D |
| 5 (C) | 162.7 | 344.3 | 114.5 | Fail | 4.0 | N/D |
| 6 (C) | 157.0 | 330.0 | 111.0 | Fail | 3.8 | N/D |
| 7 (C) | 143.6 | 311.5 | 121.0 | Fail | 4.0 | N/D |
| 8 (C) | 153.3 | 322.0 | 126.0 | Fail | 3.8 | N/D |
| 9 (C) | 157.8 | 319.3 | 97.0 | Fail | 3.0 | 2.03 |
| 10 (W) | 162.2 | 330.3 | 121.0 | Pass | 1.5 | 2.24 |
| 11 (W) | 155.8 | 340.4 | 101.5 | Pass | 1.4 | 2.55 |
| 12 (W) | 156.7 | 332.7 | 112.2 | Pass | 1.0 | 1.85 |
| 13 (C) | 151.1 | 315.0 | 117.8 | Fail | 3.3 | 1.88 |
| 14 (W) | 164.4 | 347.0 | 122.3 | Pass | 1.0 | 2.03 |
| 15 (W) | 149.8 | 324.0 | 118.6 | Pass | 1.5 | 2.15 |
| 16 (W) | 161.1 | 355.5 | 132.8 | Pass | 1.0 | 1.74 |
| 17 (C) | 142.2 | 311.0 | 135.5 | Fail | 4.0 | 2.03 |

In Table 4, 'N/D' means 'Not detected' due to strong stain with high visual stain score and stain marked as 'fail'. The silicone pressure sensitive adhesives prepared by curing the compositions described in Table 2 and Table 3 have <200 gf/in of initial adhesion, <150 g of tack property, and <400 gf/in of adhesion change after aging for 24 hrs at 85° C./85% of humidity condition. The most important thing is to provide minimal or no stain called as 'a kind of silicone migration' which remains 'discoloration' on surface of adherend where a silicone pressure sensitive adhesive is attached. 'Stain' of a silicone pressure sensitive adhesive is measured by both test methods, which is checked with naked eyes and is detected by spectrometer. For example, Run 0 prepared as described in Comparative Example 0, and evaluated described above in Reference Example 6, had visual stain score '1.5' with 'Pass' but Run 0 evaluated as described above in Reference Example 7, showed high deviation of discoloration with delta E '4.65'. So, Run 0 failed because the sample provide minimal or no stain measured by both test conditions. Run 1, Run 3 to Run 9, Run 13 and Run 17 also failed one or both stain test conditions. It is desirable for the silicone pressure sensitive adhesive according to this invention to provide minimal or no stain under both test conditions.

Runs 1 to 7 screened various compounds as migration reducing additives for the silicone pressure sensitive adhesive composition. Run 2 showed that certain polydialkylcyclosiloxanes were useful to reduce stain of a silicone pressure sensitive adhesive made from the composition. Runs 1 and 3 to 9 were comparative and showed that when no additive was used, or when a linear polydiorganosiloxane was used instead of a cyclic, stain performance was poor under the conditions tested. Runs 9-17 showed that when pressure sensitive adhesive compositions containing the amounts of each polydialkylcyclosiloxane within the ranges described herein were cured, improved stain properties were achieved, however, when too little or too much of one or more of the polydialkylcyclosiloxane species was present, more staining was observed on one or more adherends.

INDUSTRIAL APPLICABILITY

Without wishing to be bound by theory, it is thought that migration that can result in staining is caused by unreacted silicone species in a silicone pressure sensitive adhesive. Previous attempts to minimize or eliminate migration included increasing crosslink density of the cured silicone pressure sensitive adhesive, e.g., by controlling the type and amount of crosslinker, changing the functional group and amount of the polydiorganosiloxane gum, and elimination of volatile unreacted species, such as linear and cyclic polydiorganosiloxanes. The inventors surprisingly found that adding certain volatile cyclic siloxanes of the types and in the amounts described herein actually reduced (rather than increased) staining.

The protective film prepared using the pressure sensitive adhesive composition and methods described above may be used to protect a surface of an appliance from damage such as scratching during storage and shipping or poisoning such as attracting dust or foreign material during assembly process in device.

Definitions and Usage of Terms

All amounts, ratios, and percentages are by weight unless otherwise indicated. The amounts of all starting materials in a composition total 100% by weight. The Summary and the Abstract are hereby incorporated by reference. The articles 'a', 'an', and 'the' each refer to one or more, unless otherwise indicated by the context of specification. The singular includes the plural unless otherwise indicated. The term "comprising" and derivatives thereof, such as "comprise" and "comprises" are used herein in their broadest sense to mean and encompass the notions of "including," "include," "consist(ing) essentially of," and "consist(ing) of." The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

Any ranges and subranges relied upon in describing various embodiments of the present invention independently and collectively fall within the scope of the appended claims and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "1.0 to 17" may be further delineated into a lower third, i.e., 1 to 6.3, a middle third, i.e., 6.4 to 11.6, and an upper third, i.e., 11.7 to 17, which individually and collectively are within the scope of the appended claims and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. Furthermore, an individual number within a disclosed range may be relied upon and provides adequate support for specific embodiments within the scope of the appended claims. For example, a range "1.0 to 17" includes various individual integers, such as 1.0, 3.0, 5.0, 8.0, and 17 as well as individual numbers including a decimal point (or fraction), such as 1.2, 4.1, 4.8, 8.7, and 8.8 which may be relied upon and provide adequate support for specific embodiments within the scope of the appended claims.

Abbreviations used herein are defined in Table 5.

TABLE 5

Abbreviations

| Abbreviation | Definition |
|---|---|
| ° C. | Degrees Celsius |
| COD | cyclooctadiene |
| cSt | centistokes |
| Da | Daltons |
| DP | Degree of polymerization |
| ETCH | 1-ethynyl-1-cyclohexanol |
| g | Grams |
| gf | Grams force |
| GPC | Gel Permeation Chromatography |
| hr | hours |
| in | inch |
| kgf | Kilograms force |
| Me | methyl |
| min | minutes |
| Mn | Number average molecular weight, which can be evaluated by GPC as described in U.S. Pat. No. 9,593,209 in Reference Example 1 |
| Mw | Weight average molecular weight, which can be evaluated by GPC as described in U.S. Pat. No. 9,593,209 in Reference Example 1 |
| um | micrometer |
| Vi | vinyl |

Embodiments of the Invention

In a first embodiment, a silicone pressure sensitive adhesive composition comprises:

100 parts by weight of (A) a polydiorganosiloxane gum of unit formula $(R^1_3SiO_{1/2})_a(R^1_2R^2SiO_{1/2})_b(R^1_2SiO_{2/2})_c$-, where each $R^1$ is an independently selected alkyl group of 1 to 10 carbon atoms; each $R^2$ is an independently selected alkenyl group with 2 to 10 carbon atoms; subscript a is 0, 1, or 2; subscript b is 0, 1, or 2; subscript c≥0; subscript d≥0; (c+d) has a value sufficient to provide the gum with a molecular weight ≥400,000 Da; a quantity (b+d) is sufficient to provide a silicon bonded alkenyl content of at least 0.06 weight % based on weight of the polydiorganosiloxane gum;

(B) a polyorganosilicate resin with unit formula $(R^1_3SiO_{1/2})_e(R^1_2R^2SiO_{1/2})_f(SiO_{4/2})_g(ZO_{1/2})_h$, where $R^1$ and $R^2$ are as described above, Z is a hydrogen atom or an alkyl group of 1 to 6 carbon atoms, subscripts e, f, g, and h represent mole fractions of each unit, e≥0, f>0, g>0, h≥0, and a quantity (e+f+g)=1; where starting materials (A) and (B) are present in amounts sufficient to provide a molar ratio of amount of (B) to amount of (A) (Resin:Gum ratio) of 1.5:1 to 0.5:1;

(C) a polyorganohydrogensiloxane of unit formula $(R^1_3SiO_{1/2})_2(HR^1SiO_{2/2})_i$, where $R^1$ is as described above, subscript i is sufficient to give the polyorganohydrogensiloxane, a viscosity of 10 to 30 cSt;

where starting materials (A), (B), and (C) are present in amounts sufficient to provide a molar ratio of silicon bonded hydrogen atoms in starting material (C) to alkenyl groups in starting materials (A) and (B) of 10:1 to 50:1

(D) a polydialkylcyclosiloxane selected from the group consisting of 0.35 to 4.1 parts by weight of (d1) an octaalkylcyclotetrasiloxane of unit formula $(R^1_2SiO_{2/2})_4$, 0.51 to 4.5 parts by weight of (d2) a decaalkylcyclopentasiloxane of unit formula $(R^1_2SiO_{2/2})_5$, 0.33 to 2.4 parts by weight of (d3) a dodecaalkylcyclohexasiloxane of unit formula $(R^1_2SiO_{2/2})_6$, and (d4) combinations of two or more of (d1), (d2), and (d3), with the proviso that combined amounts of (d1), (d2) and (d3) total 1.2 to 8.9 parts by weight, per 100 parts by weight of starting material (A);

(E) a hydrosilylation reaction catalyst in an amount sufficient to provide 10 ppm to 7,500 ppm of platinum metal by weight based on combined weights of starting materials (A), (B), (C), (D), (E), and (F); and 0.1 to 5 parts by weight of (F) a hydrosilylation reaction catalyst inhibitor; and (G) an organic solvent, in an amount sufficient to provide 10% to 90 weight % solvent based on combined weights of starting materials (A), (B), (C), (D), (E), (F), and (G); with the proviso that the silicone pressure sensitive adhesive composition is free of hydroxyl-functional polydiorganosiloxane gum.

In a second embodiment, in the composition of the first embodiment, each $R^1$ is methyl and each $R^2$ is vinyl.

In a third embodiment, in the composition of the first embodiment (or the second embodiment), the gum has a number average molecular weight of 600,000 Da to 800,000 Da and an alkenyl content of at least 0.06 weight %.

In a fourth embodiment, in the composition of the first embodiment (or any one of the first to third embodiments), the resin has a number average molecular weight of 5,000 Da to 8,000 Da and a ratio of monofunctional units to quadrifunctional units of 0.9:1 to 1.1:1.

In a fifth embodiment, in the composition of the first embodiment (or any one of the first to fourth embodiments), starting material (D) comprises 0.36 weight part to 4.0 weight parts of (d1) the octaalkylcyclotetrasiloxane, 0.52 weight part to 4.4 weight parts of (d2) the decaaalkylcyclopentasiloxane, and 0.34 weight part to 2.3 weight parts of (d3) the dodecaalkylcyclohexasiloxane.

In a sixth embodiment, in the composition of the first embodiment (or any one of the first to fifth embodiments), the combined amounts of (d1), (d2) and (d3) total 1.3 to 8.8 parts by weight, per 100 parts by weight of starting material (A).

In a seventh embodiment, a method comprises:

optionally 1) treating a surface of a substrate, 2) applying a silicone pressure sensitive adhesive composition to the surface of the substrate, where the silicone pressure sensitive adhesive composition comprises 100 parts by weight of (A) a polydiorganosiloxane gum of unit formula $(R^1_3SiO_{1/2})_a(R^1_2R^2SiO_{1/2})_b(R^1_2SiO_{2/2})_c(R^1R^2SiO_{2/2})_d$, where each $R^1$ is an independently selected alkyl group of 1 to 10 carbon atoms; each $R^2$ is an independently selected alkenyl group with 2 to 10 carbon atoms; subscript a is 0, 1, or 2; subscript b is 0, 1, or 2; subscript c≥0; subscript d≥0; (c+d) has a value sufficient to provide the gum with a molecular weight≥400,000 Da; a quantity (b+d) is sufficient to provide a silicon bonded alkenyl content of at least 0.06 weight % based on weight of the polydiorganosiloxane gum;

(B) a polyorganosilicate resin with unit formula $(R^1_3SiO_{1/2})_e(R^1_2R^2SiO_{1/2})_f(SiO_{4/2})_g(ZO_{1/2})_h$, where $R^1$ and $R^2$ are as described above, Z is a hydrogen atom or an alkyl group of 1 to 6 carbon atoms, subscripts e, f, g, and h represent mole fractions of each unit, e≥0, f>0, g>0, h≥0, and a quantity (e+f+g)=1; where starting materials (A) and (B) are present in amounts sufficient to provide a molar ratio of amount of (B) to amount of (A) (Resin:Gum ratio) of 1.5:1 to 0.5:1;

(C) a polyorganohydrogensiloxane of unit formula $(R^1_3SiO_{1/2})_2(HR^1SiO_{2/2})_i$, where $R^1$ is as described above, subscript i is sufficient to give the polyorganohydrogensiloxane, a viscosity of 10 to 30 cSt;

where starting materials (A), (B), and (C) are present in amounts sufficient to provide a molar ratio of silicon bonded hydrogen atoms in starting material (C) to alkenyl groups in starting materials (A) and (B) of 10:1 to 50:1

(D) a polydialkylcyclosiloxane selected from the group consisting of 0.27 to 8.0 parts by weight of (d1) an octaalkylcyclotetrasiloxane of unit formula $(R^1_2SiO_{2/2})_4$, 0.39 to 8.8 parts by weight of (d2) a decaalkylcyclopentasiloxane of unit formula $(R^1_2SiO_{2/2})_5$, 0.26 to 5.0 parts by weight of (d3) a dodecaalkylcyclohexasiloxane of unit formula $(R^1_2SiO_{2/2})_6$, and (d4) combinations of two or more of (d1), (d2), and (d3), with the proviso that combined amounts of (d1), (d2) and (d3) is 0.91 to 17.2 parts by weight, per 100 parts by weight of starting material (A);

(E) a hydrosilylation reaction catalyst in an amount sufficient to provide 10 ppm to 7,500 ppm of platinum metal by weight based on combined weights of starting materials (A), (B), (C), (D), (E), and (F); and 0.1 to 5 parts by weight of (F) a hydrosilylation reaction catalyst inhibitor; and (G) an organic solvent, in an amount sufficient to provide 10% to 90 weight % solvent based on combined weights of starting materials (A), (B), (C), (D), (E), (F), and (G); with the proviso that the silicone pressure sensitive adhesive composition is free of hydroxyl-functional polydiorganosiloxane gum, 3) removing all or a portion of the solvent, and 4) curing the composition, thereby forming an adhesive article.

In an eighth embodiment, in the method of the seventh embodiment, starting material (D) is selected from the group consisting of 0.35 to 4.1 parts by weight of (d1) the octaalkylcyclotetrasiloxane of unit formula $(R^1_2SiO_{2/2})_4$, 0.51 to 4.5 parts by weight of (d2) the decaalkylcyclopentasiloxane of unit formula $(R^1_2SiO_{2/2})_5$, 0.33 to 2.4 parts by weight of (d3) the dodecaalkylcyclohexasiloxane of unit formula $(R^1_2SiO_{2/2})_6$, and (d4) combinations of two or more of (d1), (d2), and (d3), with the proviso that combined amounts of (d1), (d2) and (d3) total 1.2 to 8.9 parts by weight, per 100 parts by weight of starting material (A).

In a ninth embodiment, in the seventh (or eighth) embodiment, the substrate is a plastic film and the adhesive article is a protective film.

In a tenth embodiment, the method of the ninth embodiment further comprises applying the protective film to an adherend, protecting the adherend, and thereafter removing the protective film.

In an eleventh embodiment, in the method of the tenth embodiment, the adherend is a surface of an appliance or electronic device.

In a twelfth embodiment, in the method of the seventh embodiment (or any one of the seventh to eleventh embodiments), starting material (D) comprises 0.36 weight part to 4.0 weight parts of (d1) the octaalkylcyclotetrasiloxane, 0.52 weight part to 4.4 weight parts of (d2) the decaaalkylcyclopentasiloxane, and 0.34 weight part to 2.3 weight parts of (d3) the dodecaalkylcyclohexasiloxane.

In a thirteenth embodiment, in the method of the seventh embodiment (or any one of the seventh to twelfth embodiments), the combined amounts of (d1), (d2) and (d3) total 1.3 to 8.8 parts by weight, per 100 parts by weight of starting material (A).

In a fourteenth embodiment, a protective film is prepared by the method of the seventh embodiment (alternatively any one of the seventh to the ninth embodiments).

In a fifteenth embodiment, the protective film of the fourteenth embodiment is used for protecting an adherend during assembly, storage, shipping, or a combination of two or more thereof.

In a sixteenth embodiment, a silicone pressure sensitive adhesive composition comprises:

100 parts by weight of (A) a polydiorganosiloxane gum of unit formula $(R^1_3SiO_{1/2})_a(R^1_2R^2SiO_{1/2})_b(R^1_2SiO_{2/2})_c(R^1R^2SiO_{2/2})_d$, where each $R^1$ is an independently selected alkyl group of 1 to 10 carbon atoms; each $R^2$ is an independently selected alkenyl group with 2 to 10 carbon atoms; subscript a is 0, 1, or 2; subscript b is 0, 1, or 2; subscript c≥0; subscript d≥0; (c+d) has a value sufficient to provide the gum with a molecular weight≥400,000 Da; a quantity (b+d) is sufficient to provide a silicon bonded alkenyl content of at least 0.06 weight % based on weight of the polydiorganosiloxane gum;

(B) a polyorganosilicate resin with unit formula $(R^1_3SiO_{1/2})_e(R^1_2R^2SiO_{1/2})_f(SiO_{4/2})_g(ZO_{1/2})_h$, where $R^1$ and $R^2$ are as described above, Z is a hydrogen atom or an alkyl group of 1 to 6 carbon atoms, subscripts e, f, g, and h represent mole fractions of each unit, e≥0, f>0, g>0, h≥0, and a quantity (e+f+g)=1; where starting materials (A) and (B) are present in amounts sufficient to provide a molar ratio of amount of (B) to amount of (A) (Resin:Gum ratio) of 1.5:1 to 0.5:1;

(C) a polyorganohydrogensiloxane of unit formula $(R^1_3SiO_{1/2})_2(HR^1SiO_{2/2})_i$, where $R^1$ is as described above, subscript i is sufficient to give the polyorganohydrogensiloxane, a viscosity of 10 to 30 cSt;

where starting materials (A), (B), and (C) are present in amounts sufficient to provide a molar ratio of silicon bonded hydrogen atoms in starting material (C) to alkenyl groups in starting materials (A) and (B) of 10:1 to 50:1

(D) a polydialkylcyclosiloxane selected from the group consisting of 0.18 to 8.0 parts by weight of (d1) an octaalkylcyclotetrasiloxane of unit formula $(R^1_2SiO_{2/2})_4$, 0.17 to 8.8 parts by weight of (d2) a decaalkylcyclopentasiloxane of unit formula $(R^1_2SiO_{2/2})_5$, 0.16 to 5.0 parts by weight of (d3) a dodecaalkylcyclohexasiloxane of unit formula $(R^1_2SiO_{2/2})_6$, and (d4) combinations of two or more of (d1), (d2), and (d3), with the proviso that combined amounts of (d1), (d2) and (d3) total 1.2 to 8.9 parts by weight, per 100 parts by weight of starting material (A);

(E) a hydrosilylation reaction catalyst in an amount sufficient to provide 10 ppm to 7,500 ppm of platinum metal by weight based on combined weights of starting materials (A), (B), (C), (D), (E), and (F); and 0.1 to 5 parts by weight of (F) a hydrosilylation reaction catalyst inhibitor; and (G) an organic solvent, in an amount sufficient to provide 10% to 90 weight % solvent based on combined weights of starting materials (A), (B), (C), (D), (E), (F), and (G); with the proviso that the silicone pressure sensitive adhesive composition is free of hydroxyl-functional polydiorganosiloxane gum.

In a seventeenth embodiment, in the composition of the sixteenth embodiment, each $R^1$ is methyl and each $R^2$ is vinyl.

In an eighteenth embodiment, in the composition of the sixteenth embodiment (or the seventeenth embodiment), the gum has a number average molecular weight of 600,000 Da to 800,000 Da and an alkenyl content of at least 0.06 weight %.

In a nineteenth embodiment, in the composition of the sixteenth embodiment (or any one of the sixteenth to eighteenth embodiments), the resin has a number average molecular weight of 5,000 Da to 8,000 Da and a ratio of monofunctional units to quadrifunctional units of 0.9:1 to 1.1:1.

In a twentieth embodiment, in the composition of the sixteenth embodiment (or any one of the sixteenth to nineteenth embodiments), starting material (D) comprises 0.18 weight part to 4.01 weight parts of (d1) the octaalkylcyclotetrasiloxane, 0.17 weight part to 4.43 weight parts of (d2) the decaaalkylcyclopentasiloxane, and 0.16 weight part to 1.02 weight parts of (d3) the dodecaalkylcyclohexasiloxane.

In a twenty-first embodiment, in the composition of the sixteenth embodiment (or any one of the sixteenth to twentieth embodiments), the combined amounts of (d1), (d2) and (d3) total 1.3 to 8.8 parts by weight, per 100 parts by weight of starting material (A).

In a twenty-second embodiment, a method comprises:
optionally 1) treating a surface of a substrate,
2) applying a silicone pressure sensitive adhesive composition to the surface of the substrate, where the silicone pressure sensitive adhesive composition comprises
100 parts by weight of (A) a polydiorganosiloxane gum of unit formula $(R^1_3SiO_{1/2})_a(R^1_2R^2SiO_{1/2})_b (R^1_2SiO_{2/2})_c(R^1R^2SiO_{2/2})_d$, where each $R^1$ is an independently selected alkyl group of 1 to 10 carbon atoms; each $R^2$ is an independently selected alkenyl group with 2 to 10 carbon atoms; subscript a is 0, 1, or 2; subscript b is 0, 1, or 2; subscript c≥0; subscript d≥0; (c+d) has a value sufficient to provide the gum with a molecular weight≥400,000 Da; a quantity (b+d) is sufficient to provide a silicon bonded alkenyl content of at least 0.06 weight % based on weight of the polydiorganosiloxane gum;
(B) a polyorganosilicate resin with unit formula $(R^1_3SiO_{1/2})_e(R^1_2R^2SiO_{1/2})_f(ZO_{1/2})_g(ZO_{1/2})_h$, where $R^1$ and $R^2$ are as described above, Z is a hydrogen atom or an alkyl group of 1 to 6 carbon atoms, subscripts e, f, g, and h represent mole fractions of each unit, e≥0, f>0, g>0, h≥0, and a quantity (e+f+g)=1; where starting materials (A) and (B) are present in amounts sufficient to provide a molar ratio of amount of (B) to amount of (A) (Resin:Gum ratio) of 1.5:1 to 0.5:1;
(C) a polyorganohydrogensiloxane of unit formula $(R^1_3SiO_{1/2})_2(HR^1SiO_{2/2})_i$, where $R^1$ is as described above, subscript i is sufficient to give the polyorganohydrogensiloxane, a viscosity of 10 to 30 cSt;
where starting materials (A), (B), and (C) are present in amounts sufficient to provide a molar ratio of silicon bonded hydrogen atoms in starting material (C) to alkenyl groups in starting materials (A) and (B) of 10:1 to 50:1
(D) a polydialkylcyclosiloxane selected from the group consisting of
0.18 to 8.0 parts by weight of (d1) an octaalkylcyclotetrasiloxane of unit formula $(R^1_2SiO_{2/2})_4$,
0.17 to 8.8 parts by weight of (d2) a decaalkylcyclopentasiloxane of unit formula $(R^1_2SiO_{2/2})_5$,
0.16 to 5.0 parts by weight of (d3) a dodecaalkylcyclohexasiloxane of unit formula $(R^1_2SiO_{2/2})_6$, and
(d4) combinations of two or more of (d1), (d2), and (d3),
with the proviso that combined amounts of (d1), (d2) and (d3) is 0.91 to 17.2 parts by weight, per 100 parts by weight of starting material (A);
(E) a hydrosilylation reaction catalyst in an amount sufficient to provide 10 ppm to 7,500 ppm of platinum metal by weight based on combined weights of starting materials (A), (B), (C), (D), (E), and (F); and
0.1 to 5 parts by weight of (F) a hydrosilylation reaction catalyst inhibitor; and
(G) an organic solvent, in an amount sufficient to provide 10% to 90 weight % solvent based on combined weights of starting materials (A), (B), (C), (D), (E), (F), and (G); with the proviso that the silicone pressure sensitive adhesive composition is free of hydroxyl-functional polydiorganosiloxane gum,
3) removing all or a portion of the solvent, and
4) curing the composition, thereby forming an adhesive article.

In a twenty-third embodiment, in the method of the twenty-second embodiment, starting material (D) is selected from the group consisting of
0.18 to 4.01 parts by weight of (d1) the octaalkylcyclotetrasiloxane of unit formula $(R^1_2SiO_{2/2})_4$,
0.17 to 4.43 parts by weight of (d2) the decaalkylcyclopentasiloxane of unit formula $(R^1_2SiO_{2/2})_5$,
0.16 to 1.02 parts by weight of (d3) the dodecaalkylcyclohexasiloxane of unit formula $(R^1_2SiO_{2/2})_6$, and
(d4) combinations of two or more of (d1), (d2), and (d3),
with the proviso that combined amounts of (d1), (d2) and (d3) total 1.2 to 8.9 parts by weight, per 100 parts by weight of starting material (A).

In a twenty-fourth embodiment, in the method of the twenty-second (or twenty-third) embodiment, the substrate is a plastic film and the adhesive article is a protective film.

In a twenty-fifth embodiment, the method of the twenty-fourth embodiment further comprises applying the protective film to an adherend, protecting the adherend, and thereafter removing the protective film.

In a twenty-sixth embodiment, in the method of the twenty-fifth embodiment, the adherend is a surface of an appliance or electronic device.

In a twenty-seventh embodiment, a protective film is prepared by the method of the twenty-second embodiment (alternatively any one of the twenty-second to the twenty-fourth embodiments).

In a twenty-eighth embodiment, the protective film of the twenty-seventh embodiment is used for protecting an adherend during assembly, storage, shipping, or a combination of two or more thereof.

The invention claimed is:

1. A method comprising:
optionally 1) treating a surface of a substrate,
2) applying a silicone pressure sensitive adhesive composition to the surface of the substrate, where the silicone pressure sensitive adhesive composition comprises
100 parts by weight of (A) a polydiorganosiloxane gum of unit formula $(R^1_3SiO_{1/2})_a(R^1_2R^2SiO_{1/2})_b (R^1_2SiO_{2/2})_c(R^1R^2SiO_{2/2})_d$, where each $R^1$ is an independently selected alkyl group of 1 to 10 carbon atoms; each $R^2$ is an independently selected alkenyl group with 2 to 10 carbon atoms; subscript a is 0, 1, or 2; subscript b is 0, 1, or 2; subscript c≥0; subscript d≥0; (c+d) has a value sufficient to provide the gum with a molecular weight ≥400,000 Da; a quantity (b+d) is sufficient to provide a silicon bonded alkenyl content of at least 0.01 weight % based on weight of the polydiorganosiloxane gum;
(B) a polyorganosilicate resin with unit formula $(R^1_3SiO_{1/2})_e(R^1_2R^2SiO_{1/2})_f(SiO_{4/2})_g(ZO_{1/2})_h$, where $R^1$ and $R^2$ are as described above, Z is a hydrogen atom or an alkyl group of 1 to 6 carbon atoms, subscripts e, f, g, and h represent mole fractions of each unit, e≥0, f>0, g>0, h≥0, and a quantity (e+f+g)=1;
where starting materials (A) and (B) are present in amounts sufficient to provide a molar ratio of amount of (B) to amount of (A) (Resin:Gum ratio) of 1.5:1 to 0.5:1;

(C) a polyorganohydrogensiloxane of unit formula $(R^1_3SiO_{1/2})_k(R^1_2HSiO_{1/2})_m(R^1HSiO_{2/2})_i(R^1_2SiO_{2/2})_j$, where $R^1$ is as alkyl group as described above, and subscripts k, m, i, and j represent numbers of each unit in the formula and have values such that k is 0, 1, or 2; m is 0, 1, or 2; a quantity (k+m)=2; i>0; and j≥0; and a quantity (i+j+k+m) is sufficient to provide the polyorganohydrogensiloxane with a degree of polymerization of 5 to 2000, where starting materials (A), (B), and (C) are present in amounts sufficient to provide a molar ratio of silicon bonded hydrogen atoms in starting material (C) to alkenyl groups in starting materials (A) and (B) of 10:1 to 50:1;

(D) an additive comprising a polydiorganocyclosiloxane selected from the group consisting of 0.18 to 8.0 parts by weight of (d1) an octaalkylcyclotetrasiloxane of unit formula $(R^1_2SiO_{2/2})_4$, 0.17 to 8.8 parts by weight of (d2) a decaaalkylcyclopentasiloxane of unit formula $(R^1_2SiO_{2/2})_5$, 0.16 to 5.0 parts by weight of (d3) a dodecaalkylcyclohexasiloxane of unit formula $(R^1_2SiO_{2/2})_6$, and (d4) combinations of two or more of (d1), (d2), and (d3), with the proviso that combined amounts of (d1), (d2) and (d3) is 0.91 to 17.2 parts by weight, per 100 parts by weight of starting material (A);

(E) a hydrosilylation reaction catalyst in an amount sufficient to provide 10 ppm to 7,500 ppm of platinum metal by weight based on combined weights of starting materials (A), (B), (C), (D), (E), and (F); and 0.1 to 5 parts by weight of (F) a hydrosilylation reaction catalyst inhibitor; and (G) an organic solvent, in an amount sufficient to provide 10% to 90 weight % solvent based on combined weights of starting materials (A), (B), (C), (D), (E), (F), and (G);

with the proviso that the silicone pressure sensitive adhesive composition is free of hydroxyl-functional polydiorganosiloxane gum, 3) removing all or a portion of (G) the solvent, and 4) curing the composition, thereby forming an adhesive article.

2. The method of claim 1, where each $R^1$ is methyl and each $R^2$ is selected from the group consisting of vinyl, allyl and hexenyl.

3. The method of claim 1, where (A) the polydiorganosiloxane gum has a number average molecular weight of 400,000 Da to 1,000,000 Da and an alkenyl content of 0.01% to 0.1%.

4. The method of claim 1, where (B) the polyorganosilicate resin has a number average molecular weight of 3,000 Da to 10,000 Da and a ratio of monofunctional units to quadrifunctional units of 0.6:1 to 1.1:1.

5. The method of claim 1, where (C) the polyorganohydrogensiloxane has unit formula $(R^1_3SiO_{1/2})_2(HR^1SiO_{2/2})_i$, where $R^1$ is as described above, and subscript i is sufficient to give the polyorganohydrogensiloxane a viscosity of 10 to 30 cSt measured at 25° C.

6. The method of claim 1, where starting material (D) comprises 0.3 weight part to 7.5 weight parts of (d1) the octaalkylcyclotetrasiloxane, 0.41 weight part to 8.5 weight parts of (d2) the decaaalkylcyclopentasiloxane, and 0.28 weight part to 4.5 weight parts of (d3) the dodecaalkylcyclohexasiloxane.

7. The method of claim 1, where the substrate is a plastic film and the adhesive article is a protective film.

8. The method of claim 7, further comprising applying the protective film to an adherend, protecting the adherend, and thereafter removing the protective film.

9. The method of claim 8, where the adherend is a surface of an appliance or electronic device.

10. The method of claim 8, where protecting the adherend is performed during a device assembly process, storage, shipping, and combinations of two or more thereof.

11. The method of claim 1, where the polydiorganocyclosiloxane is selected from the group consisting of 0.27 to 8.0 parts by weight of (d1) an octaalkylcyclotetrasiloxane of unit formula $(R^1_2SiO_{2/2})_4$, 0.39 to 8.8 parts by weight of (d2) a decaaalkylcyclopentasiloxane of unit formula $(R^1_2SiO_{2/2})_5$, 0.26 to 1.2 parts by weight of (d3) a dodecaalkylcyclohexasiloxane of unit formula $(R^1_2SiO_{2/2})_6$, or (d4) a combination of two or more of (d1), (d2), and (d3).

* * * * *